United States Patent [19]
Muncke et al.

[11] Patent Number: 5,103,954
[45] Date of Patent: Apr. 14, 1992

[54] PROCESS AND APPARATUS FOR REGULATING PRESSURE APPLICATION OF SETTING MECHANISMS OF TRANSMISSION ELEMENTS OF VEHICULAR TRANSMISSION SYSTEMS

[75] Inventors: Ludwig Muncke, Lohr; Winfried Rüb, Neustadt, both of Fed. Rep. of Germany

[73] Assignee: Mannesmann Rexroth GmbH, Lohr, Fed. Rep. of Germany

[21] Appl. No.: 328,449

[22] Filed: Mar. 24, 1989

[30] Foreign Application Priority Data

Mar. 24, 1988 [DE] Fed. Rep. of Germany ....... 3810013

[51] Int. Cl.$^5$ .............................................. B60K 41/22
[52] U.S. Cl. .................................. 192/3.58; 192/109 F
[58] Field of Search .................... 192/109 F, 3.58, 3.57

[56] References Cited

U.S. PATENT DOCUMENTS

| | | | |
|---|---|---|---|
| 3,583,422 | 6/1971 | Dach | 192/109 F X |
| 3,674,121 | 7/1972 | Copeland | 192/109 F X |
| 3,820,417 | 6/1974 | Allen et al. | 192/109 F X |
| 4,730,708 | 3/1988 | Hamano et al. | 192/358 X |
| 4,890,636 | 1/1990 | Higuchi | 192/109 F X |
| 4,920,861 | 5/1990 | Lorimor | 192/109 F X |
| 4,930,080 | 5/1990 | Suzuki | 192/109 F X |

FOREIGN PATENT DOCUMENTS

| | | |
|---|---|---|
| 3404156A1 | 8/1985 | Fed. Rep. of Germany . |
| 3529473A1 | 2/1986 | Fed. Rep. of Germany . |
| 3627958A1 | 2/1987 | Fed. Rep. of Germany . |
| 3531434A1 | 3/1987 | Fed. Rep. of Germany . |

Primary Examiner—Dirk Wright
Attorney, Agent, or Firm—Burns, Doane, Swecker & Mathis

[57] ABSTRACT

A process is described for application of pressure on setting mechanisms of transmission elements, e.g., band brakes or disk clutches, of an automatic transmission, particularly of the transmission system of a vehicle. In the process the control pressure applied to the setting mechanism is varied in dependence on the operating conditions. In order to eliminate transition errors and improve adaptation of the meshing behavior of the switching element, the slide of the switching element is regulated at a value adapted to the operating condition involved of the transmission and/or the vehicle. Apparatus for the implementation of the process is also described, as well as a hydraulic control system for supplying the operational chamber of a setting mechanism at a transmission element, which operational chamber has a continual leakage. In this regard, a valve device, by which the operational chamber can be rapidly filed by activation of the setting mechanism, is installed parallel to a rapid-response control valve, with which the pressure force of the transmission element parts can be influenced in a targeted manner. In this manner, it is possible for driver to feel a spontaneous reaction of the vehicle when activating the clutch or an autotmatic lever for switching between forward and reverse operation, without thereby detrimentally affecting the sensitivity and reaction time of the control valve.

22 Claims, 8 Drawing Sheets

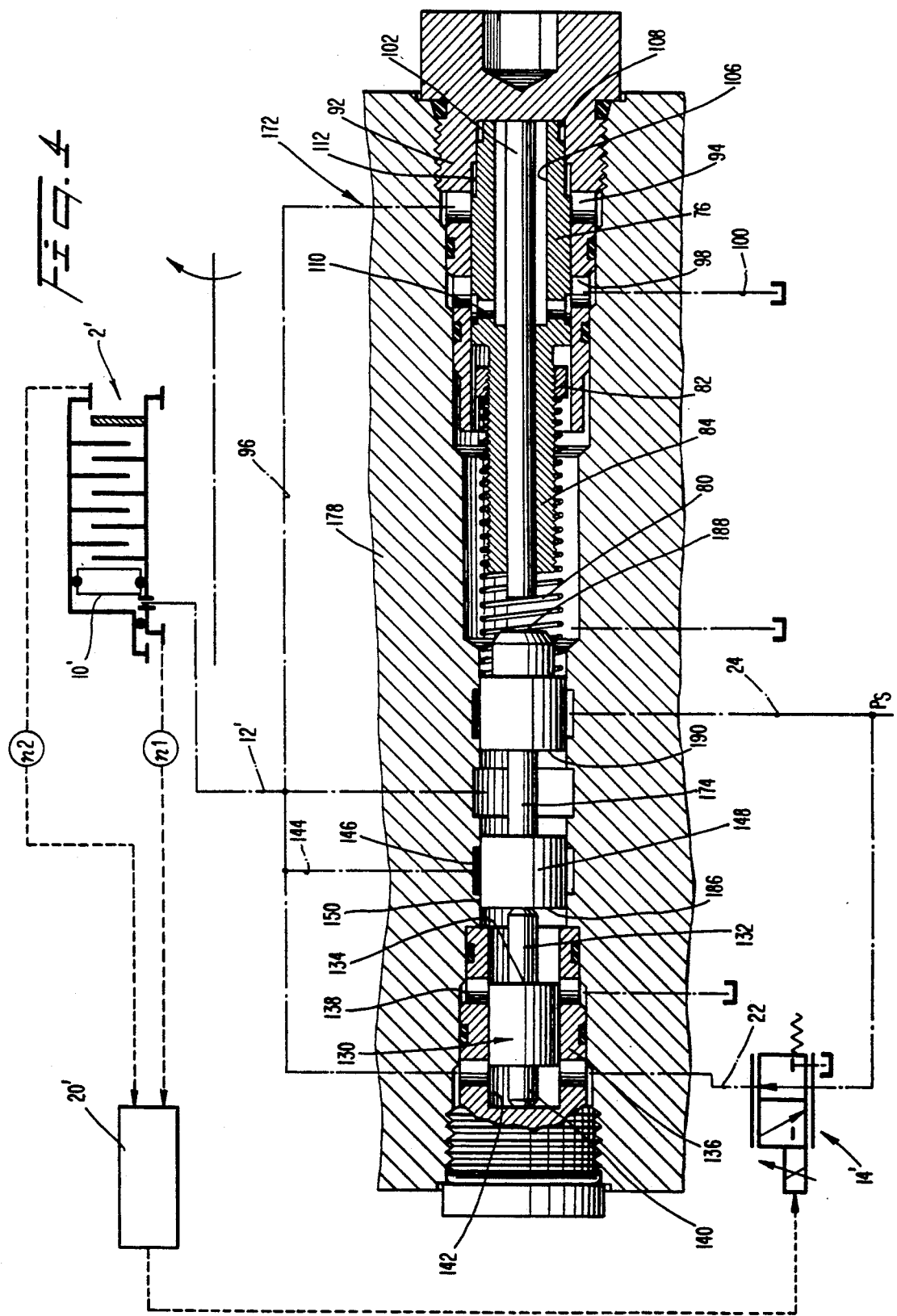

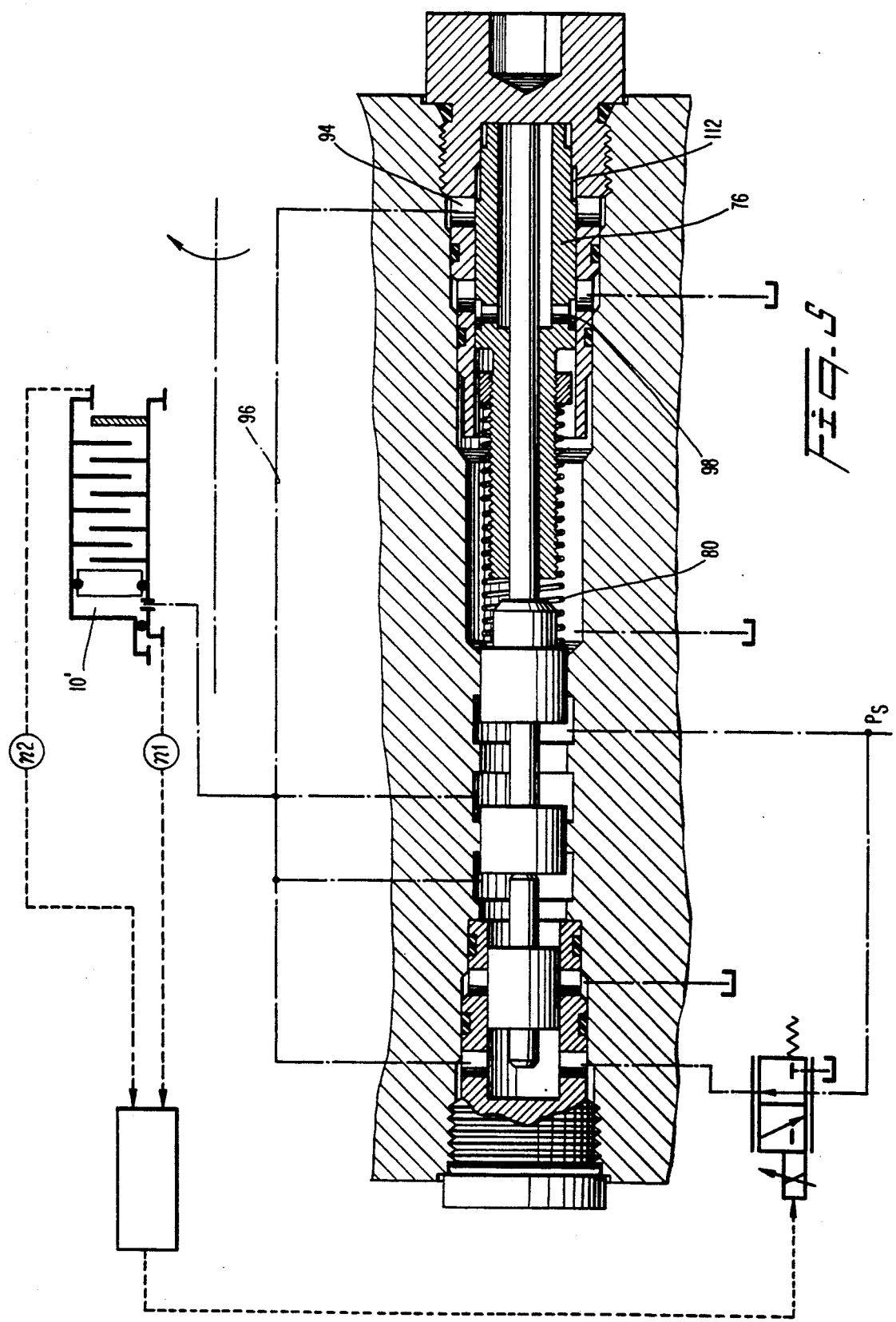

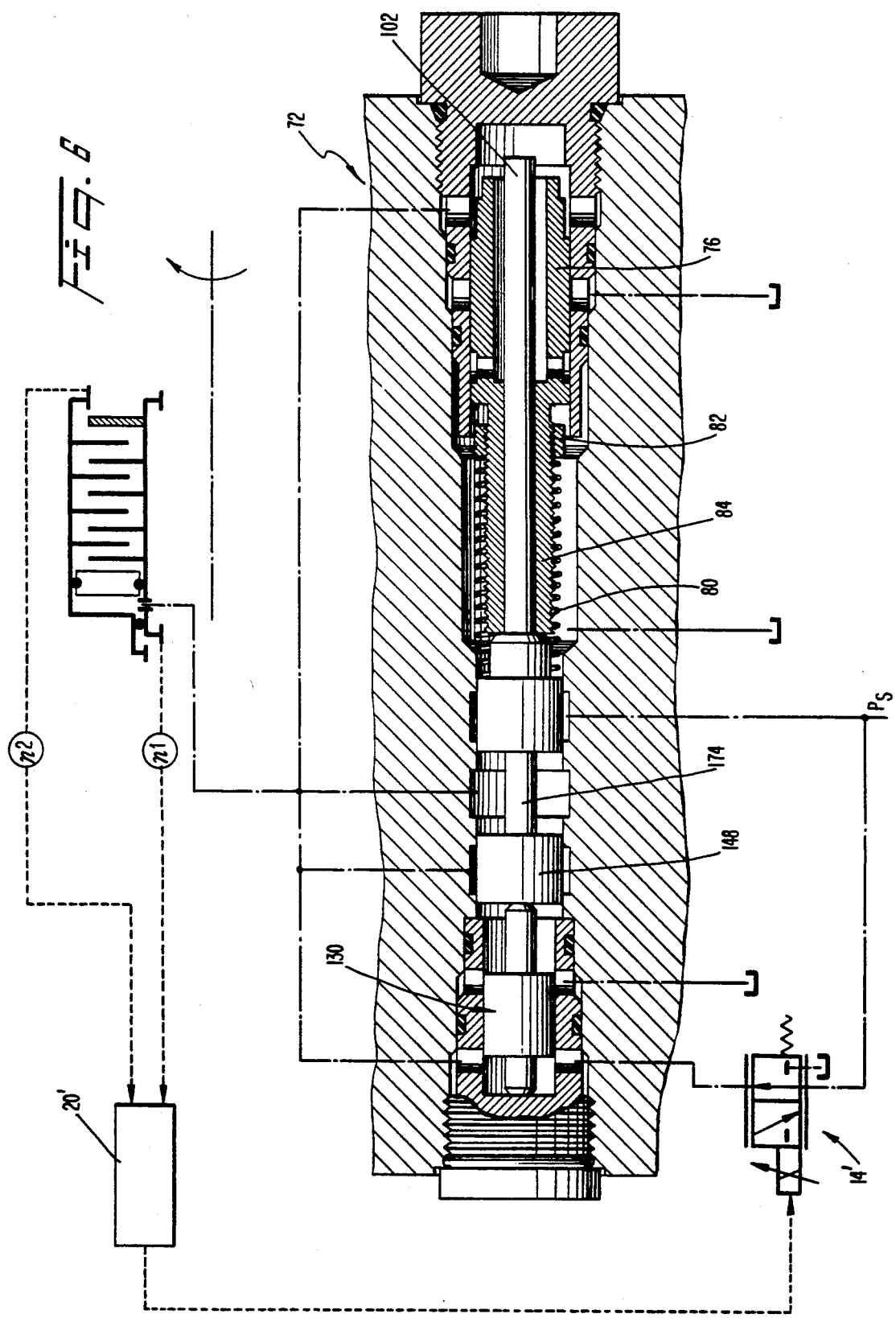

PROCESS AND APPARATUS FOR REGULATING PRESSURE APPLICATION OF SETTING MECHANISMS OF TRANSMISSION ELEMENTS OF VEHICULAR TRANSMISSION SYSTEMS

FIELD OF THE INVENTION

The invention concerns a process for pressure application of setting mechanisms of transmission elements such as band brakes, disk brakes, disk clutches, etc., of an automatic transmission, particularly of a load transmission system of a vehicle. The invention also is concerned with apparatus for the implementation of the process. In another aspect, the invention relates to a hydraulic control system for supplying hydraulic fluid to an operational chamber of a setting mechanism on the transmission element of an automatic transmission.

BACKGROUND OF THE INVENTION

For automatic vehicular transmission, it is common to control in a targeted manner the build-up and build-down of pressure at the setting mechanisms of the transmission elements, e.g., the band brakes, disk brakes, disk clutches, and the like, so that it is possible to adapt the pressure control to various operational conditions. For example, it is desirable that the control pressure for setting the action of brakes and clutches be varied in response to the entry and exit rotary speed relationships, to the rotational moment at entry, to the operational condition of the vehicle, etc. Thereby, the pressure level of the control pressure is set once according to a predetermined pattern to the automatic transmission, so that a conclusion can be drawn mathematically from the controlled pressure level to the rotational moment transferred in each case by the transmission element.

For the many uses and applications, this type of pressure control does not directly cause any serious problems, since, e.g., the rotation moment transformer installed ahead of the automatic transmission can, to a certain degree, buffer and compensate for imprecision in the pressure control. Nonetheless, with increasing length of operation of the automatic transmission, lifespan problems of the transmission elements and/or undesirable or uncomfortable operational behavior of the drive can result from transmission element wear.

These problems can become especially palpable in connection with automatic transmissions without hydraulic rotation-moment transformers. In such cases, a part of the transmission also has to be used for startup. These transmission clutches have to be of considerably larger dimensions than the other transmission clutches in order to be able to absorb the quantities of transmission part heat which occur during a brief period of time during start-up. Also, the friction surfaces of these start-up clutches have to be designed as large as possible in order to achieve as low a specific heat load as possible.

These variously-designed transmission elements have the practical consequence that changes or fluctuations of pressure application affect the rotation-moment transmission of the various transmission elements to differing degrees, which can be seriously detrimental to the clutch control and to the comfort of the passengers.

OBJECTS AND SUMMARY OF THE INVENTION

One object of the invention therefore is to provide a process for pressure application for such setting mechanisms of transmission elements of automatic transmissions so that control of the transmission elements can occur at a uniform level throughout the range of operation. This should be adapted optimally to the operating point of the given situation.

A further object of the invention is to provide apparatus which is as simple as possible for the implementation of the process.

In accordance with the invention, instead of the familiar control of the transmission element for the transmission of the rotational moment, the slip occurring at that time in the brake or other transmission element is regulated. Hence, transmission errors of the pressure application of the setting mechanisms at the transmission elements can effectively be eliminated. The pressure application is, moreover, dependent in terms of its quality on the wear characteristics of the transmission elements. This benefits not only the comfort of the passengers but also the life-span of the individual transmission elements.

In addition, the possibility is advantageously created to adapt the regulation of the individual transmission elements in an optimal manner at varying rotational moments which are to be transmitted, to the various rotation rates, by means of the utilization of an electronic regulator which generates a corrective signal. In this way, it even become possible to adapt the pressure application of individual transmission elements to certain recurring operational conditions of the vehicle and/or of the vehicular transmission system, and thus to automatize them. In this way an additional improvement in the quality of the clutch control is achieved.

A preferred form of apparatus in accordance with the invention permits correction of the pressure impacting on the operating chamber of a transmission element with a minimum of time lag. This is accomplished by means of the incorporation of a continually readjustable multi-path valve (advantageously an electrohydraulic servo-valve) in the supply line for the operational chamber. Such valves are capable of following even high signal frequencies well, so that the pressure in the operational chamber can be influenced according to a sequential regulation to adapt the transmission sequence to a very specific transmission pattern tailored to particular operational conditions.

The above-described process and apparatus operate most effectively when a control valve is employed to supply an operating chamber having constant leakage due to sliding seals of the transmission elements. Such systems differ from dry friction clutches (such for example as those used for regulating the slip of vehicular brakes or for anti-block systems or anti-slip controls) where, because of the tightness of the pressure chambers for setting the brakes or the clutch, it is only necessary to displace a fluid column.

Where pressure is to be applied to a transmission element (e.g., a disk clutch of a transmission of the design described above) which is subject to constant leakage, a constant oil flow of approximately 1-2 liters per minute occurs, even in the case of constant pressure at the transmission element.

A rapid-response control valve (e.g., an electrohydraulic servo-valve), in the inflow path to the operating chamber can reduce or raise the pressure in the operating chamber rapidly in order to increase in a targeted manner the pressure force dependent on predetermined measurement signals (e.g., dependent on the slip at the corresponding transmission element). For the continual correction of the pressure in the operational chamber, relatively slight oil or fluid flows through the control valve are required. This benefits the response behavior of the pressure regulation.

On the other hand, however, the regulation of the pressure in the operational chamber should be effective even during start-up processes in which the driver would like to feel a spontaneous reaction of the vehicle when activating the clutch pedal or of an automatic shift lever for forward and reverse operation. In this mode of operation, comparatively large fluid flows are required for the rapid filling of the operational chamber of the associated transmission element, i.e., of the associated clutch. With a control valve designed for such a level of maximum through flow, the sensitivity and the reaction time of the control valve to signal changes would be reduced.

Accordingly, another object of the invention is to provide a hydraulic-control system for transmission elements with slipping seals, i.e., with continual leakage flows, in which a control valve with very short reaction times can be used as before, without detrimental effect on the feel of the drive during start-up procedures of the vehicle.

In accordance with one aspect of the invention, a rapid-filling valve is installed parallel to the control valve, which, as before, has low flow-through and a very brief reaction time. This rapid-filling valve in effect short-circuits the hydraulic flow around the control valve for the purpose of a rapid filling procedure of the operational chamber. This rapid filling procedure is advantageously hydraulically controlled, and since it occupies only one open position for the filling procedure of the operational chamber, it can be designed in such a way that it has only one small pressure drop at large pressure flows. Through control of the rapid-filling valve device by hydraulic opening and shutting signals, the switching effort can be kept to a minimum.

In one preferred embodiment, the emptying of the operational chamber does not take place through the rapid-filling valve facility. This counteracts the danger that in case of a desired emptying of the operational chamber at dropping operational chamber pressure, a renewed opening of the rapid-filling valve device will occur without the operational chamber having first been completely emptied. A renewed opening of the rapid-filling valve device would prevent the relatively large quantity of oil which would flow in such a situation to be removed by way of the small control valve which is limited as to flow-through. Consequently, a continual opening and shutting of the rapid-filling valve device would result and the operational chamber could no longer be completely emptied.

The main valve is advantageously pre-controlled so that, given the relatively low transmission pressures, the strong flow forces which occur at the main valve body will not detrimentally affect the exactness of the transmission points.

Another feature of the invention is to ensure by simple means that the second control side of the main valve can already be relieved before the pressure in the first pre-control chamber is built down at the displacement of the transmission element, (e.g., the release of the clutch) thus permitting mistakes in transmissions to be more easily avoided.

The valve bodies of the main valve and the pre-control valves advantageously each have two impact transmission positions and are removable under the effect of a control signal against the force of a replacing spring, which is advantageously settable. This design advantageously permits the valve bodies to be installed coaxially in a common housing. According to an especially advantageous design, only two valve pistons are required in order to fulfill the above-described function of the rapid-filling valve device.

In accordance with another aspect of the invention, a snap function of the auxiliary piston is provided in a simple manner, in order to reliably provide for the displacement of the main valve piston to the closed position. If an additional snap piston is provided for the main valve piston, the displacement of the main valve piston from the closed position into the open position can be reliably provided even at very high flow forces.

BRIEF DESCRIPTION OF THE DRAWINGS

Still other objects, features and advantages of the invention will become evident from the following detailed description of various embodiments of the invention illustrated in the accompanying drawings, in which:

FIG. 4 is a representation of the hydraulic control system similar to FIG. 3, but with a second illustrative embodiment of a rapid-filling valve therein;

FIG. 5 is a diagrammatic view of the hydraulic control system shown in FIG. 4, but illustrating the filling phase for the operational chamber;

FIG. 6 is a diagrammatic view of the hydraulic control system shown in FIG. 4, but illustrating a filled operational chamber condition;

FIG. 7 is a representation, similar to FIG. 4, of a further embodiment of the hydraulic control system having therein a variation of the rapid-filling valve;

DETAILED DESCRIPTION OF PREFERRED EMBODIMENTS

Figure 1:
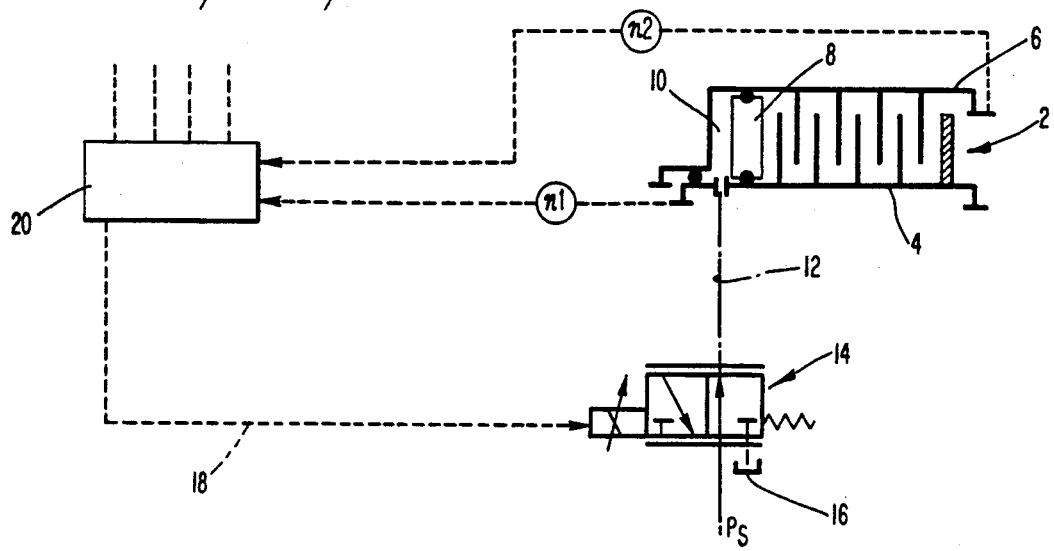
FIG. 1 is a circuit diagram of a regulatory circuit for the implementation of the process of the present invention for slip regulation at a clutch of a vehicular load transmission.

The process of the present invention for regulating pressure application to a setting mechanism of a transmission element of an automatic transmission will be explained first by reference to FIG. 1. A transmission element 2 in the form of a disk clutch controllably couples together a pair of transmission elements 4 and 6. The setting mechanism of the disk clutch 2 is designated 8. This setting mechanism is designed as a piston. The piston 8 is moveable in the transmission element 2 in such a way as to act as a seal, and defines an operational chamber 10 connected to a supply pressure line 12. A constant leakage of supply pressure flow out of the operational chamber occurs through the sliding seals of the disk clutch 2.

A control valve 14 in the form of a continually resettable multi-path electrohydraulic servo-valve is incorporated into the supply pressure line 12. The valve piston of this servo valve 14 permits a targeted effect to be exerted on the pressure in the operational chamber 10. The basically constant system or supply pressure is designated Ps while, the reference numeral 16 designates a hydraulic fluid tank.

The control valve 14 is controlled by a control line 18, which conducts a correction signal (advantageously, an electrical signal) emitted by a regulation device 20. The regulation device 20 generates the correction signal in the control line 18 independent upon the slip of the disk clutch 2.

For this purpose, the rotation rate n1 of the first transmission element 4 and the rotation n2 of the second transmission element 6 are constantly being monitored by a device and reported to the regulation device 20, as indicated by the dotted lines in FIG. 1. The regulator device 20 calculates the correction signal for the control valve 14 from the actual value of the slip (i.e., the actual value of the rotation-rate difference n1-n2) and a preprogrammed ideal value or value progression, so that the operational chamber 10 of the disk clutch 2 can be supplied with an oil or hydraulic fluid flow adapted to the slip optimally desired at this point in the operational sequence.

During the calculation of the correction signal, a number of other factors can be incorporated. Examples of such factors are the rotational moment of the engine, the rotation rate of the engine, the momentarily current transition stage or the transition relationship of the transmission system in the gear to which it has just been shifted, or even the transmission-shift pattern. This permits adaptation and automatization of the shift progressions at certain recurring operational conditions of the transmission and of the vehicle.

Thus, it will be seen from FIG. 1 that in the invention pressure application of the setting mechanism 8 of the disk clutch 2 occurs due to the fact that the control valve 14 is a part of the regulation path for regulating the slip of the disk clutch 2. In this way, the pressure application operates largely independently of the wear phenomena in the disk clutch.

Moreover, the regulation of the pressure in the operational chamber 10 occurs independently of the dimensioning of the disk clutch 2, so that disruptions of the pressure-supply circuit no longer affect the response behavior of the disk clutch 2 in a negative manner. Smaller pressure changes (which would affect more seriously the engagement behavior of a disk clutch having relatively larger disk clutch surfaces) can be reliably regulated away by means of the system of the present invention. If inappropriate to the drive situation, slip can be eliminated from the outset, which can increase the life span of the transmission elements.

The regulation device 20 advantageously consists of an electronic regulation system, so as to permit rapid adaptation to the current operational condition of the vehicle an/or the transmission and/or the driving conditions.

It has been mentioned above that the control valve 14 for the provision of short reaction times ordinarily has a very low flow-through. These flow-through quantities are sufficient to regulate the slip in the engaged position of the disk clutch 2. However, with rapid forced-pulling slipping, it is necessary to first of all rapidly fill the operational chamber 10 of the disk clutch 2, in order to engage the clutch. Only then can the pressure force be increased in a targeted manner dependent on the slide n1-n2. With start-up procedure too, considerable fluid quantities have to flow through the supply pressure line 12 to the control chamber 10, so that the driver will feel a spontaneous reaction of the vehicle when activating the clutch pedal or the automatic lever for switching between forward and reverse operation.

Figure 2:
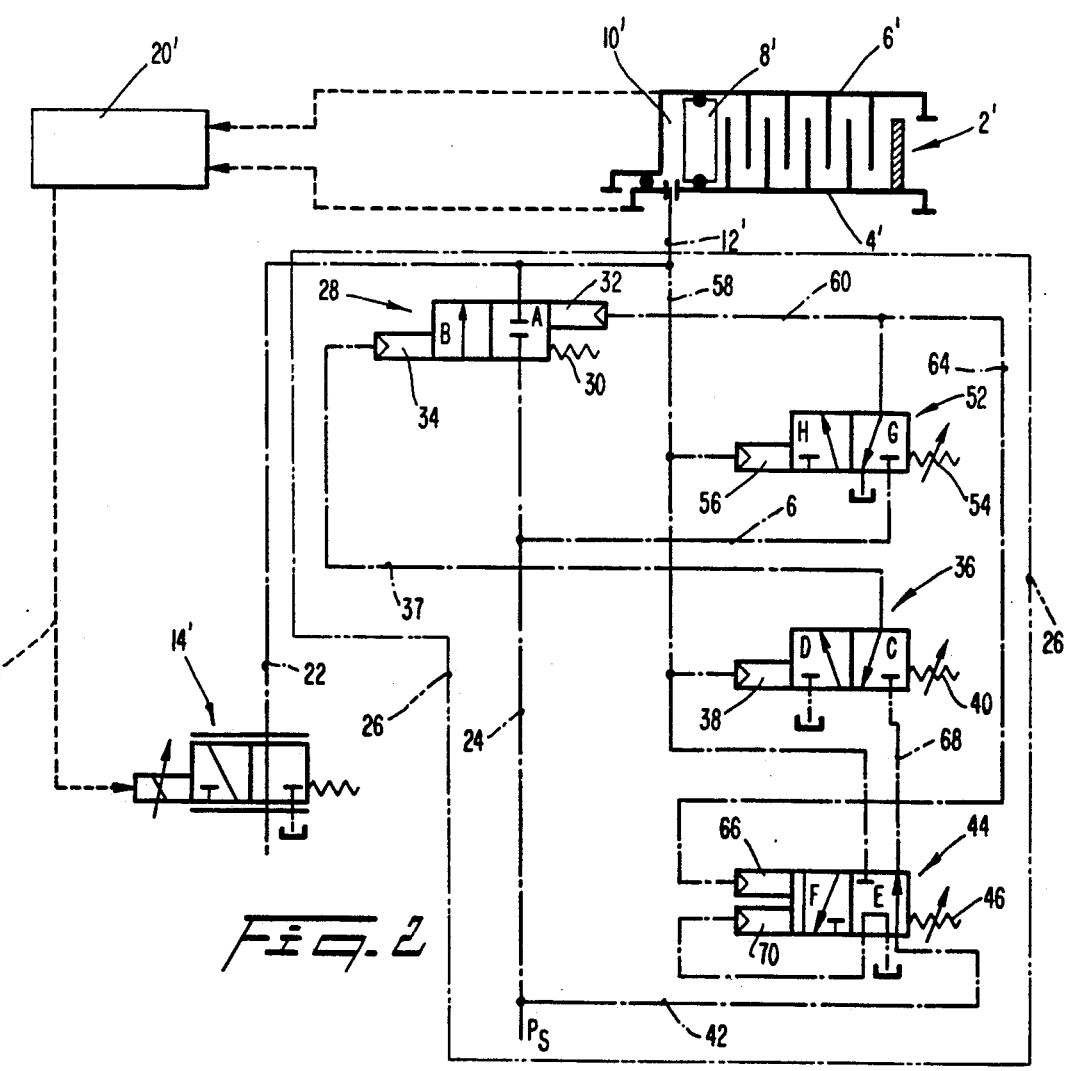
FIG. 2 is a circuit diagram of a hydraulic control transmission for a supply of the operational chamber of a setting mechanism at a transmission element as per FIG. 1.

A hydraulic-control transmission as per FIG. 2 is provided so that the sensitivity and reaction time of the control valve in respect to signal changes are not detrimentally affected by this requirement. Those portions of the hydraulic control transmission which correspond to the elements shown in FIG. 1 are provided with identifying reference numbers with an added prime symbol, in order to facilitate the description.

The difference between the hydraulic control system of FIG. 2 and the system of FIG. 1 is that a rapid-filling branch 24 (which is fed by the supply pressure Ps) is installed parallel to a supply line branch 22 passing through the control valve 14'. A rapid-filling valve device 26 is incorporated into the rapid-filling branch 24.

The rapid-filling valve device 26 has a hydraulically-controlled main valve 28 with two switch positions A and B, whereby the main valve piston can be brought into the shut position A under the effect of the replacing spring 30 when the control sides 32 and 34 are under equal pressure. In order to open the main valve 28, a hydraulically controlled pre-control valve 36 is provided.

Supply pressure controlled by the control valve 14' and impacted upon the operational chamber 10' is applied to a control side 38 of the pre-control valve 36. The pressure impacting upon this control side 38 operates in opposition to a spring 40, which can advantageously be set. The spring 40 is designed so that the force of the spring can be overcome by a response-supply pressure of approximately 0.5 bar. This permits the pre-control valve 36 to be moved from one switch position C to a second switch position D.

In the switch position C, the control side 34 of the main valve 28 is switched to "tank". However, in switch position D, a connection is accomplished between the control side 34 of the main valve 28 and a further supply pressure branch line 42. This supply pressure branch line 42 passes through an additional multi-path valve 44 which prepares the opening of the main valve 28, and the functional manner of which will be explained in greater detail below. For now it will be sufficient to point out that, in switch position E of the valve 44 (at the raising of the supply pressure Ps), the pressure from line 42 is switched through to the pre-control valve 36.

The main valve 28 has a further pre-control valve 52 assigned to it and designed to initiate the shutting function of the main valve 28. For this purpose, the pre-control valve 52 is designed similarly to the pre-control valve 36 which serves to initiate the opening of the main valve 28. A control side 56 of the pre-control valve 52 operates in opposition to an advantageously settable replacing spring 54 and is fed with the supply pressure pertaining in the operational chamber 10' by way of an auxiliary control line 58. This line 58 is likewise connected to the control side 38 of the pre-control valve 36.

The spring 54 is set in such a way that it is overcome when the operational chamber 10' of the disk clutch 2' is pressurized. This permits the pre-control valve 52 to be moved out of the switch position G into the switch position H. This ideal filling pressure is somewhere between 4 and 8 bar.

In the switch position G shown in FIG. 2, a control pressure line 60 leading to the control side 32 of the main valve 28 is relieved into the tank. Simultaneously, another supply pressure branch line 62 leading to the pre-control valve 52 is closed.

In the switch position H, the pressure in this additional supply pressure branch line 62 is switched through to the control pressure line 60 and the tank connection is closed. A control line 64, which leads to the multi-path valve 44, is connected to the control pressure line 60, which line leads to a first control chamber 66 of the multi-path valve 44. Under the effect of the pressure pertaining in the first control chamber 66, a valve piston of the multi-path valve 44 is moved out of the switch position E to the switch position F by overcoming the force of a replacing spring 46 (which again is advantageously settable) whereby the connection to the supply pressure branch line 42 is closed. A line section 68 between the valves 36 and 44 is relieved and an extension of the auxiliary control line 58 is connected with a second control chamber 70 of the multi-path valve 44. The force of the spring 46 is selected such that it can be overcome on the other side of the valve piston by the going into effect of a pressure less than the response pressure of the pre-control valve 36, (e.g., 0.3) bar.

The operation of hydraulic control system of FIG. 2 will now be summarized. At a hydraulic-supply pressure of Ps=0, all the valves (i.e., the main valve 28, the pre-control valves 36 and 52 and the multi-path valve 44) are in the positions shown in FIG. 2. When the supply pressure Ps is raised and achieves a response-pressure valve (e.g., about 0.5 bar) behind the control valve 14' in the supply branch line 22, the replacing spring 40 of the pre-control valve 36 is overcome by the pressure force on the control side 38 so that the pre-control valve is moved to the switch position D. At this position, by way of the supply pressure branch line 42, the supply pressure reaches the control side 34 of the main valve 28 via the pre-control pressure line 37. As a result, the main valve 28 switches to pressure flow, so that the operational chamber 10' can be rapidly filled. The pressure drop at the main valve is very slight even at great flow speeds.

If the pressure in the operational chamber 10', reaches a pre-defined filling pressure (advantageously settable by means of the spring 54 of the additional pre-control valve 52), the pre-control valve 52 is moved out of the switch position G into the switch position H so that the supply pressure Ps is also applied to the other control side 32 of the main valve 28. Under the effect of the force of the replacing spring 30, the valve gate of the main valve 28 is moved from the switch position B back to the switch position A, thus ending the rapid-filling phase. The supply to the operational chamber 10' then occurs exclusively by way of the supply line branch 22, which passes through the control valve 14'.

Simultaneously with the application of pressure to the control side 32 of the main valve 28, pressure is applied to the control line 64, and valve 44 is thus moved out of the switch position E to the switch position F. In the switch position F, the inflow to the line section 68 is closed and simultaneously this line 68 is relieved into the tank. Moreover, in this switch position F a connection between the auxiliary control line 58 and the second or additional control chamber 70 of the multi-line valve 44 is created.

If the disk clutch 2' is to be disengaged, the pressure in the line slowly drops. As soon as the pressure once again drops below the above-mentioned filling pressure, the pre-control valve 52 switches back to the switch position G and thereby relieves the control side 32 of the main valve 28 to the tank. The main valve stays in the closed position A, since the other control side 34 has already previously been relieved by way of the multi-path valve 44, and the replacing spring 30 ensures a defined switch position. The main valve 28 can only be reopened when the pressure forces impacting on the valve pistons of the multi-path valve 44 via the control chambers 66 and 70 have become so slight that the force of the replacing spring 46 can overcome this pressure force. The setting is accomplished such that it is at a pressure less than the response pressure of the main valve, i.e., less than the switch pressure of the pre-control valve 36 of approximately 0.5 bar.

In an exemplary embodiment of the control system, the switch pressure of the multi-path valve 44 is at approximately 0.3 bar. When this limit-pressure (which is less than the response pressure) is achieved, the multi-path valve 44 reopens the flow to the pre-control valve 36 which assumes a preparatory position for the opening of the main valve 28. The multi-path valve 44 thus fulfills the function of a preparatory valve, preparing for the renewed opening of the main valve 28.

A circuit diagram of the rapid filling valve device 26, along with the basic function of this valve system, were described above. In the following, several concrete embodiments of rapid filling valve devices suitable to be incorporated into the hydraulic control circuit of FIG. 2 will be described. In order to facilitate the description, those sections of the system already described by reference to FIG. 2 will be designated with the same reference numbers.

Figure 3:
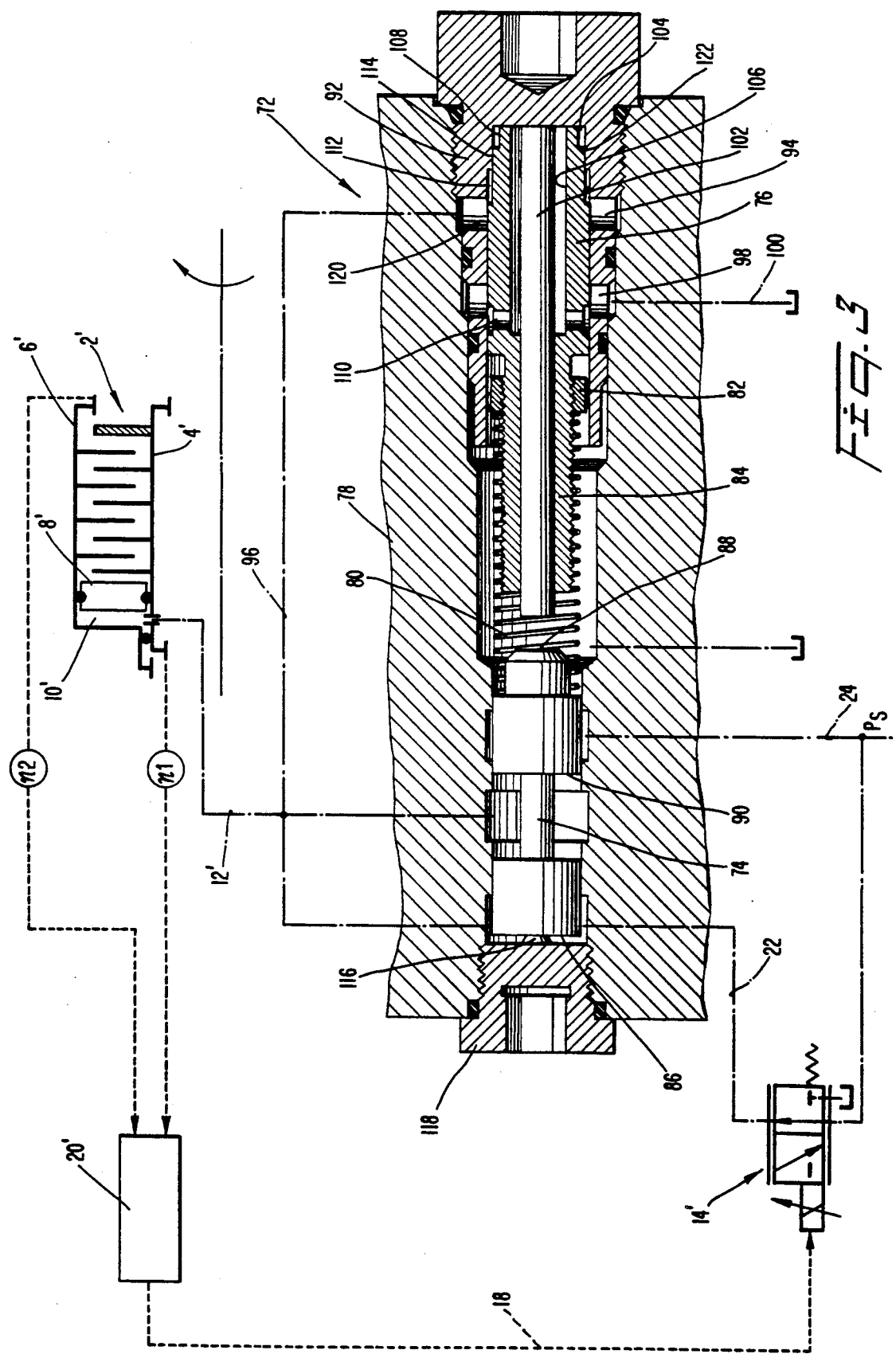
FIG. 3 is a block circuit diagram similar to FIG. 2 having shown thereon an initial illustrative embodiment of a rapid-filling valve for the operational chamber of the transmission element.
Figure 1:
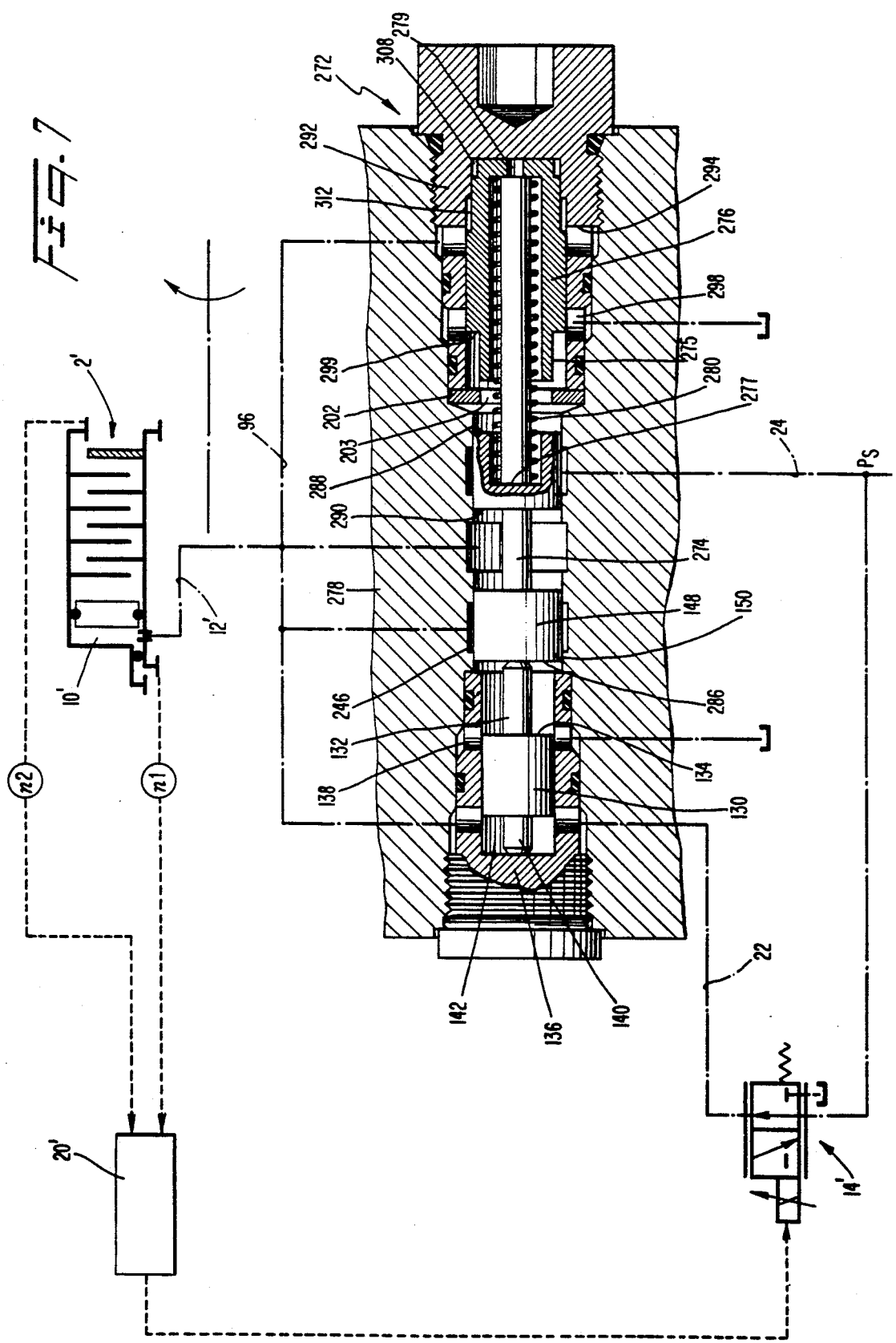

In FIG. 3, the supply line branch 22 is passed through the control valve 14', which is opened by the regulatory device 20'. Parallel to it, the rapid-filling branch 24 runs through a rapid-filling valve 72 in order to rapidly fill the supply pressure line 12' when the disk clutch 2' is engaged. The rapid-filling valve 72 has two valve pistons, a main valve piston 74 and an auxiliary valve piston 76, which are received in a manner so as to be moveable in a common valve housing 78. Between the two valve pistons 74 and 78, a pressure spring 80 is installed, the pre-tension of which can be set by means of a threaded ring 82, which meshes with an external threading of an extension 84 of the auxiliary piston 76. The left frontal side 86 of the main valve piston 74 is impacted by the pressure in the supply line branch 22. The right frontal side 88 is relieved into the tank. The control edge by means of which the connection between the rapid-filling branch 24 and the supply pressure line section 12' is controllable, is designated 90.

A drilled hole in the housing for reception of the valve pistons 74 and 76 is stepped in order to be able to receive the auxiliary piston 76, which is greater in diameter. The right side of the auxiliary piston 76, as shown in FIG. 3, is movable in a sliding manner in a valve shell 92. The shell 92 is screwed into the valve housing 78 and is provided with a first drilled hole 94 for attachment to an auxiliary control line 96 which branches off from the supply pressure line 12'. It also is provided with a second drilled hole 98, which is advantageously diametrical, for attachment to a relieving line 100 to the tank.

The extension 84 leads to an impact pin 102, which is advantageously ground. The right-hand end of pin 102 can impact on a floor surface 104 of the valve sheath 92. In the illustrated right-hand impact position of the auxiliary piston 76, a control chamber 108 is connected with the tank connection 100 via a drilled hole 106 and a radial tap hole 110. The diameter of hole 106 is kept greater than the impact pin. In this switch position, the control chamber 108 is, however, screened off from an additional control chamber 112 by a fitting-surface matching 114, so that in the position of the auxiliary piston 76 shown in FIG. 3, the pressure effective in the auxiliary control line 96 will not immediately become effective in the control chamber 108.

FIG. 3 shows the condition of the valve pistons for the eventuality that the supply pressure Ps or the pressure of the control valve in the line 22 has not yet reached the above-mentioned response pressure value. In this situation, the effect of the pressure spring 80 causes the auxiliary piston 76 to assume its right-hand impact position. The main valve piston 74 is pressed with an impacter 116 against a threaded stopper 118.

With increasingly rising supply pressure Ps, or with increasing pressure in the line 22, the main valve piston 74 is moved against the force of the pressure spring 80 toward the right and, upon reaching response pressure, opens the connection between the rapid-filling branch 24 and the supply-pressure line section 12' via the control edge 90. In this situation, the right-hand frontal side 88 impacts against the left end of the impact pin 102, so that the main valve piston 74 assumes a second switch position. The operational chamber 10' of the disk clutch 2' can now be rapidly filled.

The now continually climbing supply pressure Ps (the climbing pressure in the line 22) is passed to the additional control chamber 112 via the auxiliary control line 96 and the drilled hole 94. The supply pressure, which thereby impacts on the relatively small radial control surface 120 causes the auxiliary piston 76 to be moved slowly toward the left relative to the impact pin 102, and against the force of the pressure spring 80. As a result, the connection between the tap hole 110 and the connection drilled hole 98 to the tank is for the time being closed.

When the supply pressure Ps reaches a predefined filling pressure, the auxiliary piston 76 will have been pushed so far to the left that the control edge designated 122 will have formed a connection between the control chamber 108 and the control chamber 112. As a result, the entire right-hand cross-section surface of the auxiliary piston 76 will be suddenly subjected to supply pressure. An additional high snap force is generated which initially pushes the auxiliary valve piston 76 toward the main valve piston 74. However, due to the fact that the diameter of the auxiliary valve piston 76 is kept greater than the diameter of the main valve piston, both pistons will now move leftward together as a unit until the impacter 116 of the main valve piston 74 once again lies against the threaded stopper 18. The connection between the line sections 24 and 12' is then once again closed, so that in this operating condition, the opening of the operational chamber 10' occurs solely via the control valve 14'.

The pressure spring 80, which is under tension in this situation, can only move the auxiliary valve piston 76 back to the resting position shown in FIG. 3 when the pressure in the auxiliary control line 96, which impacts on the entire right-hand frontal side of the auxiliary valve piston at this switch condition, has dropped below the above-described response pressure of the rapid filling valve system, e.g., 0.3 bar. Subsequently, the main valve piston 74 can be opened at a supply pressure level of 0.5 bar.

From the foregoing description it will be clear that, for the illustrative embodiment of the rapid-filling valve 72 shown in FIG. 3, the generation of a higher snap force is provided during the closing procedure of the main valve 72. The result is that the main valve piston 74 can reliably assume its closed position even if a high flow force generated by the large through-flow of fluid is present. In the opening of the main valve, the generation of such an increased snap force is missing.

An illustrative embodiment of a rapid-filling valve which can also generate such a snap force during opening of the main valve piston will now be described in greater detail by reference to the FIGS. 4 through 6. In these figures, those elements of the hydraulic control transmission which, in terms of function and design, are comparable to the elements of the above-described embodiment, are designated with the same reference numbers.

The rapid-filling valve 172 again receives a main valve piston 174 and auxiliary valve piston 76 in its stepped interior drilled hole, which is impacted with pressure in the same manner, and operates in the same manner, as the auxiliary piston of the embodiment of FIG. 3. In order to avoid repetition, the functional manner of the auxiliary piston 76 will not again be explained in any detail. The main valve piston 174, too, essentially corresponds in terms of design to the main valve piston 74 of the embodiment of FIG. 3. The only difference is the manner in which the left-hand frontal side 186 is impacted with pressure and supports itself against an impacter. The left-hand frontal side 186 lies, in the non-tension switch position shown in FIG. 4, against the extension 132 of a pre-control piston 130. The piston 130 is received in such a manner as to be slidable back and forth in a valve sheath 136, and can provide for relieving the frontal side 186 (e.g., to the tank) by means of a control edge 134 together with a relief drilled hole 138.

On the other side, the pre-control piston 130 is supported via an impact extension 140 by a floor surface of the valve sheath 136, which is advantageously screwed into the housing 178. In this manner, a control-pressure chamber 142 is defined inside the valve sheath 136, which is impacted by systemic pressure Ps via the supply line branch 22. Downstream from the control pressure chamber 142, a control pressure line 144 branches off from the supply line branch 22, which line leads to the main valve, i.e., to a ring space of the housing 178 in the area of the main valve piston 174. In the switch position shown, i.e., in the relieved position of the rapid-filling valve 172, a piston section 148 closes a connection between the control line 144 and the left-hand frontal side 186 of the main valve piston 174, so that the latter remains relieved to the tank.

The opening of the main valve for the rapid filling of the operational chamber 10' of the switch element 2' via the rapid-filling branch 24 of the control transmission occurs in the following manner. When the supply pressure Ps or the pressure in the line 22 is increased, this pressure reaches the control pressure chamber 142 via the control valve 14' and the supply line branch 22. As a result the pre-control piston 130 gradually is pushed to the right in FIG. 4, against the force of a common pressure spring 80, which is represented only schematically. This initially causes the relief drilled hole 138 to be closed via the control edge 134, before an application of systemic pressure Ps on the left-hand frontal side 186 of the main valve piston 174 via a control edge 150 occurs when a response pressure is achieved. This causes a rapid increase in the force exerted by the supply pressure on the main valve piston 174. As a result the latter strikes the impact pin 102 with its right-hand frontal side 138, thereby opening the connection between the rapid filling branch 24 and the supply-pressure line section 12' with its control edge 190.

The control transmission is now in its rapid-filling phase, as shown in FIG. 5. Now, an ever-increasing pressure builds up in the control chamber 112 via the auxiliary control line 96 and the attachment drilled hole 94, as has already been described in detail in connection with the embodiment as per FIG. 3. This pressure ensures that the auxiliary valve piston 76 is gradually pushed leftward against the force of the pre-tensed pressure spring 80.

After closing of the connection drilled hole 98 to the tank, the auxiliary valve piston 76 opens the connection to the control chamber 108 once a predetermined filling pressure of the operational chamber 10' is reached. This causes the entire right-hand frontal side of the auxiliary valve piston 76 to be impacted with systemic pressure Ps, and the entire valve group to snap to the left, closing the main valve. In this regard, it should be emphasized that the generation of the snap force is also affected by the cross-section surface of the impact pin 102, so that the entire drilled-hole cross-section can be used for the auxiliary valve piston 76, for the closing function of the main valve.

The auxiliary valve piston 76 can only assume the right-hand impact position shown in FIG. 6 when the pressure at the right-hand frontal side of the auxiliary valve piston and thus the supply pressure Ps drops below the above-mentioned response pressure. After this, the valve piston again assumes the position shown in FIG. 4, and the main valve is prepared for opening.

Another rapid-filling valve device according to the invention is shown in FIG. 7. It operates in the same manner as the rapid-filling valve FIGS. 4 through 6. The distinctive feature of this embodiment is the especially small design length of the valve. Even with this embodiment, those parts corresponding to the above-described elements are designated with the same identifying numbers. For this reason, the left-hand side of the valve will not be described in any detail, since it corresponds to the embodiment as per FIGS. 4 through 6.

The designs of the main valve piston 274 and the auxiliary piston 276 are different, which are now formed as cup-shaped pistons which receive the pressure spring 280 into their interiors. Instead of the impact pin used in the above-described embodiments, an impact ring 202 is fixed rigidly in the housing 278, for which purpose it is advantageous to make use of a valve sheath 202. The left end of the pressure spring 280 is supported in a recess 277 of the main valve piston 274. An opening 203 is adapted in terms of diameter to a control extension 275 of the auxiliary piston 276. This control extension 275 leads into a control edge 299, by means of which a connection to a tank connection drilled hole 298 can be controlled.

In the relieved position shown in FIG. 7, the control edge 299 causes a relief of the entire interior space of the auxiliary piston 276 and of the right-hand frontal side 288 of the main valve piston 274. Simultaneously, a pressure relief of a control chamber 308 is accomplished via an axial drilled hole 279, which chamber corresponds in terms of design and function to the control chamber 108 of the above embodiment examples. An additional control chamber, which can be impacted with systemic pressure via a connection drilled hole 294, is designated as 312.

The rapid-filling valve 272 of FIG. 7 functions as follows. First of all, the control pressure chamber 142 of the pre-control piston 130 is impacted via the control valve 14' by a controlled supply pressure Ps so that the pre-control piston 130 is gradually pushed to the right against the force of the pressure spring 280, resulting in the closing of the relief drilled hole 138. When a response pressure is exceeded, e.g., around the order of magnitude of 0.5 bar, the left-hand frontal side 286, which constitutes a control edge, reaches a ring space 246 which is impacted with supply pressure. As a result, the main valve piston 274 snaps rightward until it lies against the impact ring 202, whereby a connection between the rapid-filling branch and the supply pressure line section 12' is created at this impact position. The operational chamber 10' of the transmission element 2' is now rapidly filled.

The ever-increasing supply pressure impacts via the auxiliary control line 96 onto the control space 312, as a result of which the auxiliary piston 276 is pushed leftward against the force of the pre-tensed pressure spring 280. First of all, the control edge 299 closes the connection drilled hole 298. As soon as a predetermined filling pressure has been achieved, the auxiliary piston will have been pushed so far leftward that the connection between the control chambers 208 and 212 will have been established, so that the force impacting on the right-hand side of the auxiliary piston 276 will be rapidly increased. All valves will be moved leftward together via the auxiliary valve piston 276, in order to move the main valve piston 274 to the closing position shown in FIG. 7. Supply pressure Ps also reaches the interior of the auxiliary piston 276 via the drilled hole 279, and from there to the surface delimited by the control extension 275 of the right-hand frontal side of the main valve piston 274, which contributes to the increase of the replacing force. A replacing movement of the auxiliary piston 276 is only possible when the supply pressure drops below the above-described response pressure.

Figure 8:
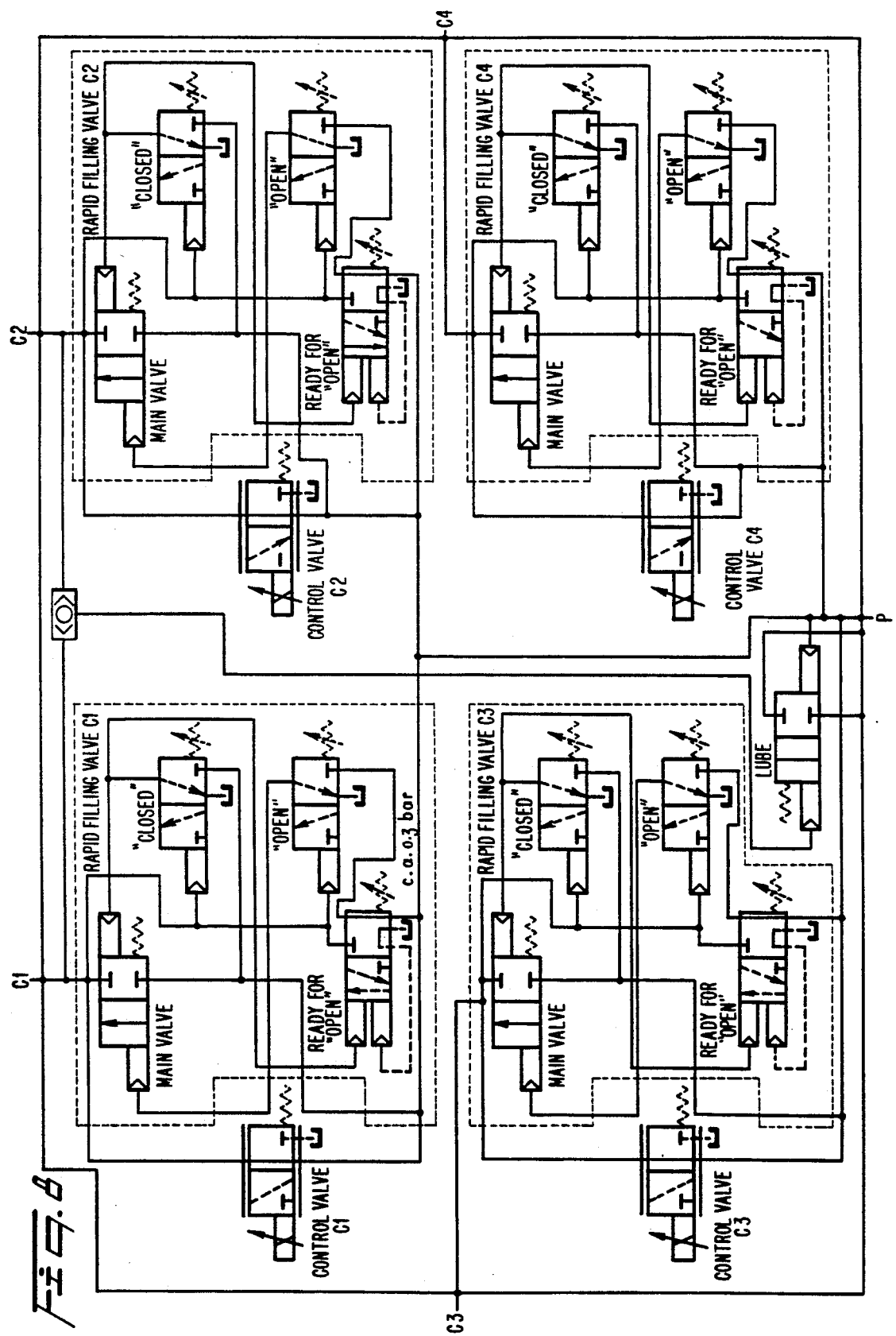
FIG. 8 is a transmission diagram for an automatic load transmission with four shift clutches equipped with a hydraulic control transmission as per FIG. 2.

In FIG. 8, a transmission control for a load-transmission of a farm tractor is schematically represented. From this drawing, it can be seen that each of four clutches C1, C2, C3 and C4 have a control clutch as per FIG. 2 assigned to them. A targeted opening of the supply pressure circuits assigned to each of the clutches occurs by way of a shift plan that will not be described in any detail.

Figure 9:
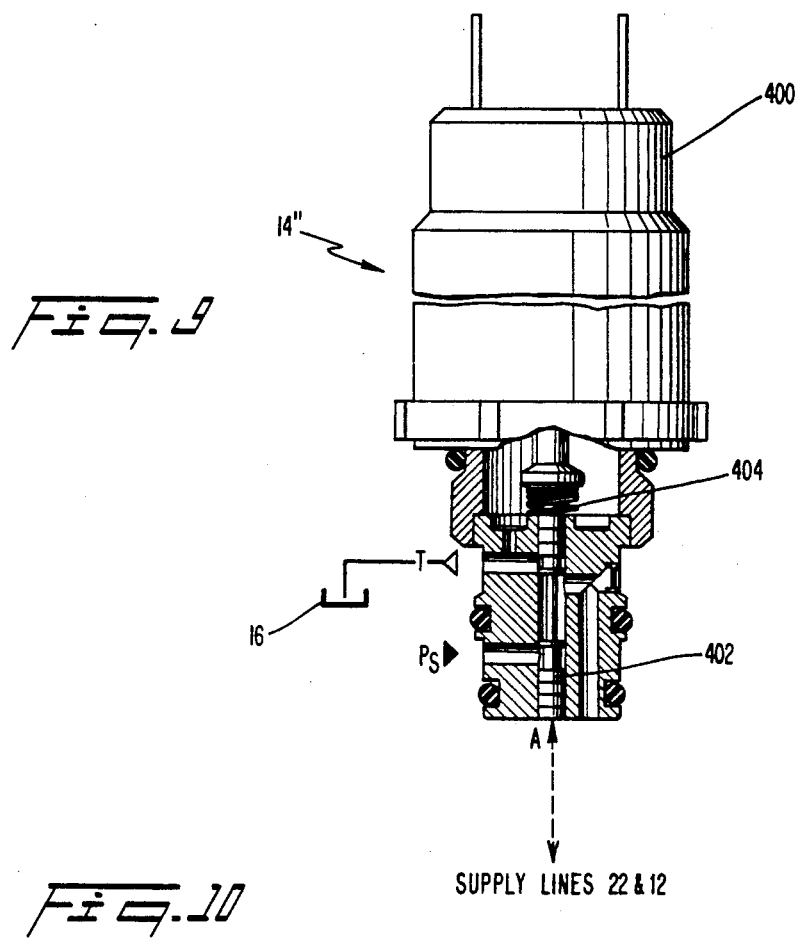
FIG. 9 is a view shown partially in section of a control valve embodied as an electrically-controlled proportional pressure reduction valve.

In FIG. 9, an embodiment of the control valve 14 or 14' is shown schematically. This is an electrically-controlled proportional pressure-reduction valve, as marketed by Applicant's assignee under the type designation DRE 2 K. With this valve, the pressure at the connection A, i.e., at the connection to the line 22 or 12, is reduced in proportion to the applied solenoid current. The solenoid is identified by the designation number 400. The method of operation of the valve 14 is largely independent of the entry pressure Ps. The hydraulic pressure in attachment A effects the end of a valve body 402 so that a force opposite to the solenoid force is generated. If the proportionally operating solenoid valve is discharged, the attachment A is connected with the attachment Under the effect of the retrieval spring 404, which Attachment T leads to a tank 16. The valve can be operated with standard voltage of 12 and 24 V.

Figure 10:
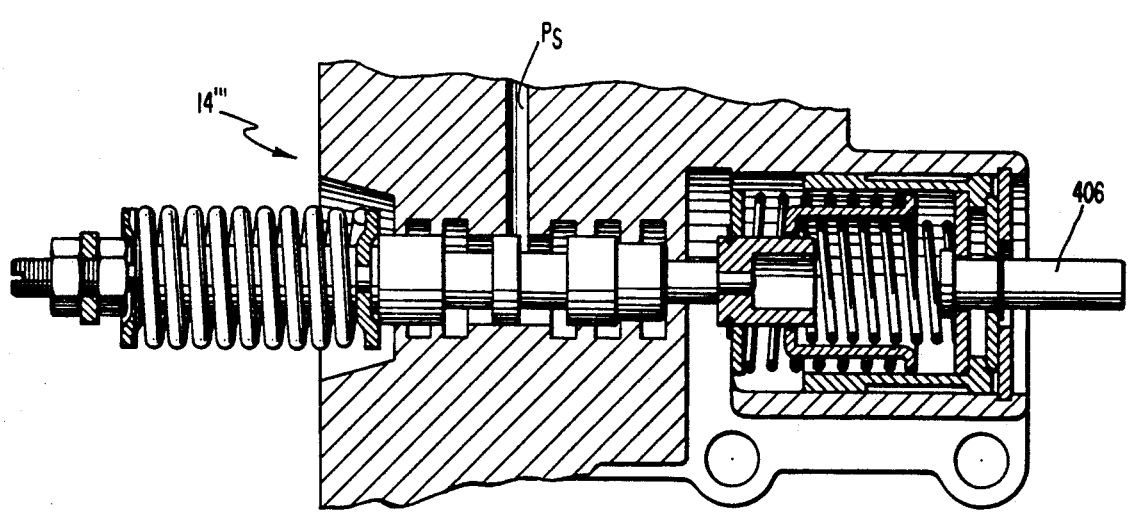
FIG. 10 is a schematic section view of a control valve in an embodied as a mechanically-activated reduction valve.

In FIG. 10, a further embodiment of a control valve 14" is shown, which can be used in this invention in place of the above-described control valves. This control valve is designed as a mechanically-activated pressure-reduction valve. For this, e.g., a familiar clutch valve can be used. The opening occurs with this valve from the right side via a plunger 406, which is activated according to a signal which is proportional to the signal in the line 18. The systemic pressure pertaining at the connection Ps is reduced with the increasing application of pressure to the plunger 406 at the connection A, due to the fact that with increasing application of pressure to the spring device on the right side of the valve, the spring force on the left side of the piston slide is reduced. For installation into the control system of this invention, it is of course not necessary to provide three connections A. Rather, it is enough to provide a single connection A, to which the line 22 of the control system is attached.

It should be emphasized that the invention is not meant to be restricted to the above described concrete embodiment examples. Even if an advantageous application of the inventive procedure for the pressure impacting of setting mechanisms on transmission elements shows a transmission without a hydraulic rotation-moment invertor, it is of course also possible to additionally install the inventive procedure in an automatic transmission with a hydraulic rotation-moment invertor. The area of application is also not limited to load transmissions. The invention can be used whenever it is important to regulate a setting mechanism to a high degree in a relatively small pressure range, but to provide the increase of this pressure level within a very brief period of time.

The advantages of the hydraulic control transmission are also provided if the control valve 14 or 14' is not controlled by a regulator for slip regulation of the transmission elements 2 or 2'. Moreover, the control valve can also be controlled hydraulically.

Thus, the invention creates a procedure for pressure application on setting mechanisms of transmission elements, e.g., hand-brakes or disk clutches, of an automatic transmission, particularly of a vehicular load transmission, in which the control pressure applied to the setting mechanism is varied in dependence on the operating conditions. In order to eliminate transition errors and improve adaptation of the meshing behavior of the switching element, the slide of the switching element is regulated at a value adapted to the operating condition involved of the transmission and/or the vehicle.

The invention moreover creates a device for the implementation of the process, as well as a hydraulic control transmission for supplying the operational chamber of a setting mechanism at a transmission element, especially one under pressure as per the inventive procedure, the operational chamber of which element has a continual leakage. In that regard, a valve device, by which the operational chamber can be rapidly filled by activation of the setting mechanism, is installed parallel to a rapid-response control valve, with which the pressure force of the transmission elements parts can be influenced in a targeted manner. In this manner, it is possible for the driver to feel a spontaneous reaction of the vehicle when activating the clutch or an automatic lever for switching between forward and reverse operation, without thereby detrimentally affecting the sensitivity and reaction time of the control valve.

What is claimed is:

1. A control system for supplying hydraulic fluid to an operational chamber of a setting mechanism of a transmission element of an automatic transmission, said system including a supply line for the operational chamber to provide continual leakage flow and leading through a rapid-response control valve, wherein valve means is installed in parallel to said rapid response control valve and serves to rapidly fill said operational chamber to initiate activation of the setting mechanism.

2. A control system according to claim 1, wherein said valve means has a main valve that has a small pressure drop at times of great fluid flow-through and is controlled in such a manner that, at an initial low response supply pressure, it assumes an open position and, after achieving a predetermined operational chamber filling pressure, it assumes a closed position from which it can only be removed after a drop of the supply pressure below the response supply pressure level.

3. A control system according to claim 2, wherein said main valve is associated with a first pre-control valve by which it is movable into its closed position, under the effect of a closing spring, when reaching the operational chamber filling pressure due to the fact that supply pressure can be applied via the first pre-control valve to a first pre-control chamber and simultaneously into a control chamber of a multi-path valve to prepare for the renewed opening of the main valve, said multi-path valve operating also to screen off from the supply pressure a second control side of the main valve until after the drop of supply pressure under the response supply pressure level, said second control side of said main valve operating in opposition to said first pre-control chamber of the said valve.

4. A control system according to claim 3, wherein said second control side of the main valve has a second pre-control valve assigned to it which, when achieving the response supply pressure, can be brought from an initial switch position, at which a supply pressure branch line is closed and the pre-control pressure line is relieved to a tank, to a position which opens the supply pressure branch line.

5. A control system according to claim 3, wherein said preparatory valve has a control chamber which is connected with the first pre-control chamber of the main valve.

6. A control system according to claim 5, wherein said preparatory valve has an additional control chamber installed parallel to the first control chamber, which is under the pressure that applies in the operational chamber at a position in which the supply pressure is screened off from the second control side of the main valve.

7. A control system according to claim 3, wherein the valve bodies of the main valve, of the pre-control valves, and of the preparatory valve are each movable against the force of a settable spring.

8. A control system according to claim 2, wherein said valve means has two valve pistons arranged coaxially in a valve housing, the first of said pistons being movable, the force of a replacing spring to open a connection of the supply pressure with the operational chamber as soon as the control pressure applied to an associated control chamber reaches the response supply pressure level, and the second of said pistons being an auxiliary piston kept in a floating position which approaches the first piston as the supply pressure increases, from which floating position, said second piston snaps into a second switch position when the operational-chamber filling pressure is attained, taking with it the first piston and enlarging the effective surface impacted by supply pressure in order to close the connection of the main valve piston.

9. A control system according to claim 8, wherein said auxiliary piston defines two control chambers on the side facing away from a replacing spring, one of which chambers is advantageously relieved via a tank connection until the pressure in another control chamber constantly under supply pressure achieves the operational chamber filling pressure level.

10. A control system according to claim 9, wherein said one of said control chambers is connected with the tank at a limit-impact position of the auxiliary piston, and wherein this connection to the tank is locked prior to the opening of the connection between the two control chambers.

11. A control system according to claim 9, wherein said auxiliary piston is a hollow piston, through which an advantageously ground impact pin for the main valve piston passes.

12. A control system according to claim 9, wherein said auxiliary piston is formed in a cup shape having an open interior facing the main valve piston and receiving a replacing spring, and wherein a ring disk is installed between the two pistons in the valve housing so as to provide a movement impacter for the main valve piston.

13. A control system according to claim 12, wherein the floor of said cup-shaped auxiliary piston, is provided with a hole for the relief of the control chamber.

14. A control system according to claim 8, wherein said main valve piston has an additional pre-control piston assigned to it, which is in impact-contact with the main valve piston, and has a control chamber fed with the pressure of the control valve, said control chamber connecting a control pressure chamber of the main valve piston with tank when the pressure is less than the response pressure.

15. A control system according to claim 14, wherein the control pressure chamber of the main valve piston can be connected to the supply pressure after the closing of a tank connection under the effect of the pre-control valve.

16. A control system according to claim 1, wherein said rapid-response control valve is a continually resettable multi-path valve and is electrically controlled.

17. A control system according to claim 1, wherein said rapid-response control valve is advantageously an electrically-controlled proportional pressure-reduction valve.

18. A control system according to claim 1, wherein said rapid-response control valve is a mechanically pre-controlled pressure-reduction valve.

19. System according to claim 1, including a control line for affecting the setting of the control valve, said control valve being part of a regulating path for the regulation of the slip of the transmission element and being formed as a continually resettable multi-path valve controlled via a correction signal line coming advantageously from an electronic regulation device.

20. System according to claim 19, including a rotation-rate monitoring device for ascertaining the slip of the transmission element.

21. System according to claim 19, wherein said control valve is formed as an electrohydraulic servo-valve, by which a volume flow leading to the operational chamber of the setting mechanism can be set to be proportional to an electrical correction signal.

22. System according to claim 19, wherein said regulation device is a memory unit for storing a field of ideal values or ideal-value procedures which are assigned to certain operational conditions of the transmission and/or the vehicle.

* * * * *